(12) United States Patent
Ly et al.

(10) Patent No.: US 10,419,199 B2
(45) Date of Patent: Sep. 17, 2019

(54) SYNCHRONIZATION IN WIRELESS COMMUNICATIONS

(71) Applicant: QUALCOMM Incorporated, San Diego, CA (US)

(72) Inventors: Hung Dinh Ly, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 15/405,997

(22) Filed: Jan. 13, 2017

(65) Prior Publication Data

US 2017/0331613 A1 Nov. 16, 2017

Related U.S. Application Data

(60) Provisional application No. 62/335,001, filed on May 11, 2016.

(51) Int. Cl.
| | | |
|---|---|---|
| H04W 56/00 | (2009.01) | |
| H04L 7/00 | (2006.01) | |
| H04L 5/00 | (2006.01) | |
| H04W 84/04 | (2009.01) | |

(52) U.S. Cl.
CPC .......... *H04L 7/0008* (2013.01); *H04L 5/0048* (2013.01); *H04W 56/00* (2013.01); *H04W 56/0015* (2013.01); *H04W 84/042* (2013.01)

(58) Field of Classification Search
None
See application file for complete search history.

(56) References Cited

U.S. PATENT DOCUMENTS

| | | |
|---|---|---|
| 2008/0273491 A1 | 11/2008 | Han et al. |
| 2008/0298326 A1 | 12/2008 | Pande et al. |
| 2009/0185541 A1* | 7/2009 | Tanno ................... H04L 5/0007 370/336 |
| 2010/0027492 A1* | 2/2010 | Asanuma .............. H04L 5/0007 370/329 |

(Continued)

FOREIGN PATENT DOCUMENTS

| | | |
|---|---|---|
| EP | 1906686 A1 | 4/2008 |
| WO | WO-2008/033985 A2 | 3/2008 |
| WO | WO-2016/021979 A1 | 2/2016 |

OTHER PUBLICATIONS

Yongzhi et al, "A Novel Time Synchronization for 3GPP LTE Cell Search", 2013 8th International Conference on Communications and Networking in China (CHINACOM).*

(Continued)

*Primary Examiner* — Kodzovi Acolatse
(74) *Attorney, Agent, or Firm* — Arent Fox LLP

(57) ABSTRACT

Aspects of the present disclosure describe synchronizing frequency and/or timing in a wireless communication system. A synchronization channel frequency can be determined as one of a plurality of possible synchronization channel frequencies within a frequency band. A tone of one or more synchronization signals that corresponds to the synchronization channel frequency can be punctured, and the one or more synchronization signals can be transmitted as centered around the synchronization channel frequency.

18 Claims, 9 Drawing Sheets

(56) References Cited

U.S. PATENT DOCUMENTS

| | | |
|---|---|---|
| 2013/0142291 A1 | 6/2013 | Dinan |
| 2014/0169361 A1* | 6/2014 | Kim ................. H04W 56/0015 370/350 |
| 2014/0341050 A1 | 11/2014 | Luo et al. |
| 2016/0087743 A1 | 3/2016 | El et al. |
| 2016/0105803 A1 | 4/2016 | Sakhnini et al. |
| 2016/0316442 A1* | 10/2016 | Seo ....................... H04W 76/14 |
| 2017/0251455 A1* | 8/2017 | Shin ................. H04W 56/0015 |
| 2017/0290016 A1* | 10/2017 | Yi ..................... H04W 72/0453 |
| 2018/0098298 A1* | 4/2018 | Jung ................ H04W 56/0045 |
| 2018/0255524 A1* | 9/2018 | Wu ....................... H04W 56/00 |

OTHER PUBLICATIONS

International Search Report and Written Opinion issued in International Patent Application No. PCT/US2017/023821, dated Jun. 9, 2017 (14 pages).

* cited by examiner

SYNCHRONIZATION IN WIRELESS COMMUNICATIONS

CLAIM OF PRIORITY UNDER 35 U.S.C. § 119

The present Application for Patent claims priority to Provisional Application No. 62/335,001 entitled "SYNCHRONIZATION IN WIRELESS COMMUNICATIONS" filed May 11, 2016, which is assigned to the assignee hereof and hereby expressly incorporated by reference herein for all purposes.

BACKGROUND

Aspects of the present disclosure relate generally to wireless communication systems, and more particularly, to performing synchronization between nodes in a wireless communication systems.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for synchronizing frequency and/or timing in a wireless communication system is provided. The method includes determining a synchronization channel frequency as one of a plurality of possible synchronization channel frequencies within a frequency band, puncturing a tone of one or more synchronization signals that corresponds to the synchronization channel frequency, and transmitting the one or more synchronization signals centered around the synchronization channel frequency.

In another example, an apparatus for synchronizing frequency and/or timing in a wireless communication system is provided. The apparatus includes means for determining a synchronization channel frequency as one of a plurality of possible synchronization channel frequencies within a frequency band, means for puncturing a tone of one or more synchronization signals that corresponds to the synchronization channel frequency, and means for transmitting the one or more synchronization signals centered around the synchronization channel frequency.

In addition, for example, an apparatus for synchronizing frequency and/or timing in a wireless communication system is provided. The apparatus includes a transceiver, a memory configured to store instructions, and at least one processor coupled to the transceiver and the memory. The at least one processor is configured to execute the instructions to determine a synchronization channel frequency as one of a plurality of possible synchronization channel frequencies within a frequency band, puncture a tone of one or more synchronization signals that corresponds to the synchronization channel frequency, and transmit the one or more synchronization signals centered around the synchronization channel frequency.

In yet another aspect, a computer-readable medium storing code executable by a processor for synchronizing frequency and/or timing in a wireless communication system is provided. The code includes code for determining a synchronization channel frequency as one of a plurality of possible synchronization channel frequencies within a frequency band, code for puncturing a tone of one or more synchronization signals that corresponds to the synchronization channel frequency, and code for transmitting the one or more synchronization signals centered around the synchronization channel frequency.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
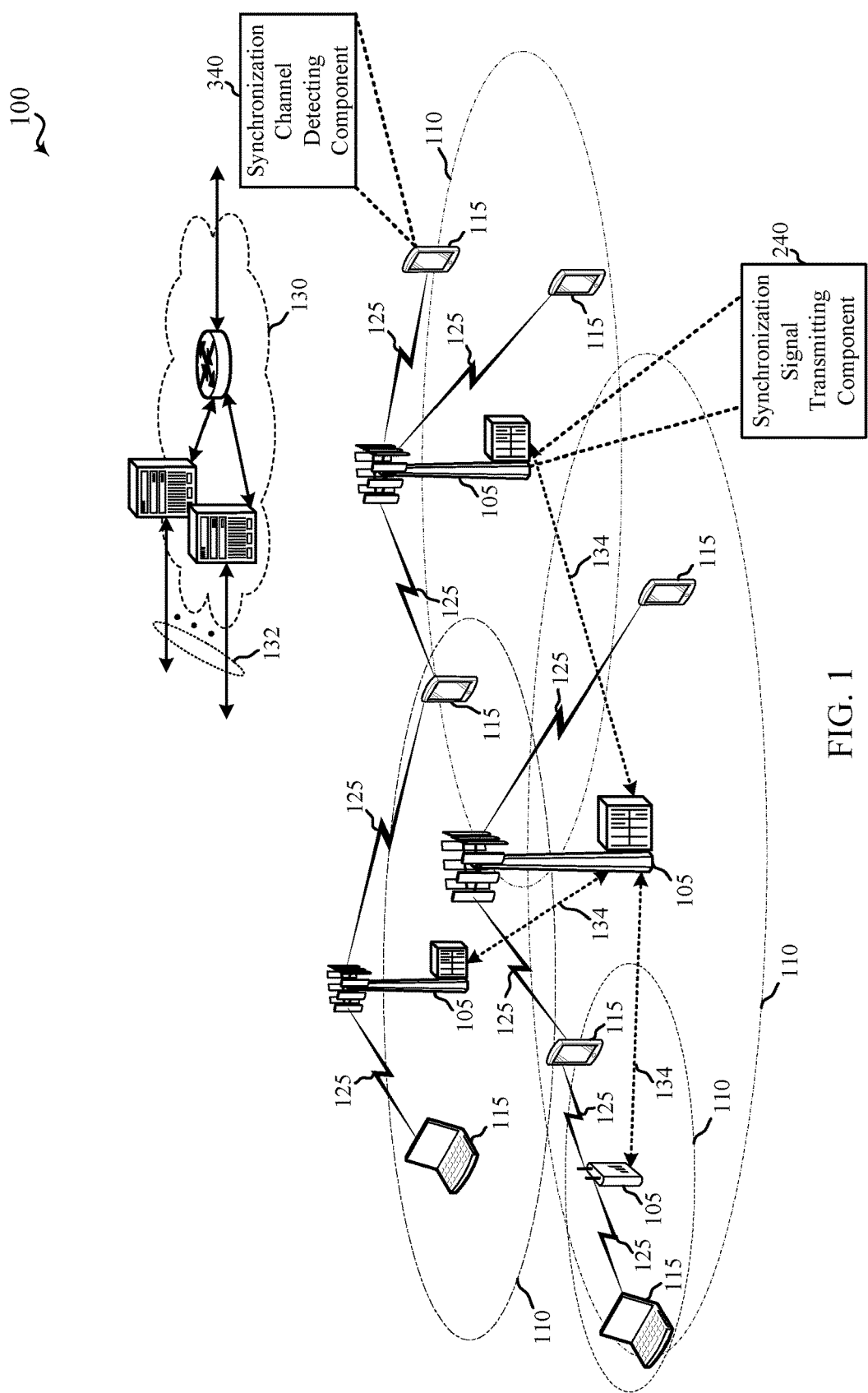
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

In a wireless multiple-access communication system, each cell of a network may broadcast synchronization signals for user equipment (UE) to discover (e.g., primary synchronization signals (PSS), secondary synchronization signals (SSS), etc.). Accordingly, the UEs can synchronize timing and/or frequency to the cell based on the synchronization signals for receiving further communications from (or transmitting communications to) the cell. For example, the UEs can accordingly receive and decode system information from the cell, which can include further information for accessing the cell (e.g., master information blocks (MIB), system information blocks (SIB), etc. over a primary broadcast channel (PBCH) or similar channel).

Wireless communication systems such as a Long Term Evolution (LTE) communication systems or LTE-Advanced (LTE-A) communication systems transmit the synchronization signals over a center channel bandwidth. As LTE uses limited system bandwidth, the UEs can attempt to discover the synchronization signals using a channel raster with multiple channel hypotheses over a system bandwidth. As system bandwidth increases, however, attempting to discover the synchronization signals based on the same channel raster may result in significant overhead and resource utilization.

The described features generally relate to communicating and detecting synchronization signals in a wireless communication system. A network component of the wireless communication system, such as an evolved Node B (eNB) or other base station or related cell, can utilize a synchronization channel frequency for transmitting a synchronization signal, where the synchronization channel frequency is an integer multiple of synchronization channel raster and the synchronization channel raster is coarser or larger than a channel raster used to define the center carrier frequency of the system bandwidth (e.g., for transmitting signals other than the synchronization signals). Thus, a wireless device, such as a user equipment (UE), attempting to synchronize timing and/or frequency with the network can attempt to detect the synchronization signals based on the synchronization channel frequencies with the coarser synchronization channel raster, which may alleviate some processing demands associated with searching for the synchronization channel based on the channel raster used for other communications.

To provide additional flexibility, for example, the minimum system bandwidth for the wireless communication system may include at least two synchronization channel frequencies over which the synchronization channel can be transmitted. In this regard, the network component can select one of the synchronization channel frequencies (e.g., corresponding to a carrier frequency) for transmitting the synchronization signals, where the synchronization channel frequency can be substantially any frequency in the system bandwidth that is on the synchronization channel raster, and the UE can accordingly attempt to detect the synchronization signals over one or more of the synchronization channel frequencies (e.g., until the synchronization signals are detected). Additionally, the network component can puncture a tone (e.g., a direct current (DC) tone) of the synchronization signal, which can correspond to substantially any tone in the system bandwidth that would allow for transmitting the synchronization signal within the system bandwidth. In addition, the synchronization channel raster may correspond to the channel raster used to define the center carrier frequency of the system bandwidth and a subcarrier spacing (e.g., a spacing in a frequency domain of a number of subcarriers or tones) defined for the wireless communication system. Moreover, for example, a bandwidth of the synchronization channel can be determined as a function of the synchronization channel raster.

In addition, the downlink reference signals such as cell-specific reference signals may be transmitted on demand in future wireless communication systems. As a result, identifying the signal waveform of these wireless communication systems may not be possible via downlink signal power spectrum, and as such the coarse synchronization channel raster design described herein may provide an efficient mechanism for identifying corresponding signal waveforms subsequently transmitted over the downlink.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. New Radio (NR) is a new release of UMTS. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., NR or LTE) communications over a shared radio frequency spectrum band. The techniques described herein are applicable to any next generation communications systems including 5th Generation (5G)/NR or LTE/LTE-A applications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), gNodeB (gNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). Additionally, the plurality of base stations 105 may operate according to different ones of a plurality of communication technologies (e.g., 5G, fourth generation (4G)/LTE, 3G, Wi-Fi, Bluetooth, etc.), and thus there may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB) may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use hybrid automatic repeat/request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, an appliance, an automobile, any other suitable "Internet of Things" (IoT) device, or the like. A UE may be a device that includes a Universal Integrated Circuit Card (UICC). A UE may be able to communicate with various types of base stations and network equipment including macro eNBs, small cell eNBs, macro gNBs, small cell gNBs, relay base stations, and the like.

The communication links 125 shown in wireless communication system 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers. Moreover, in some aspects, the wireless communication links 135 may represent one or more broadcast channels.

In aspects of the wireless communication system 100, a base station 105 may include a synchronization signal transmitting component 240 (see e.g., FIG. 2) configured to transmit one or more synchronization signals over a synchronization channel frequency, where the synchronization channel frequency for transmitting the synchronization signals is determined as one of a plurality of possible synchronization channel frequencies over a system bandwidth that correspond to a synchronization channel raster. In an example, synchronization signal transmitting component 240 can puncture a tone (e.g., a DC tone) of the synchronization signal within the system bandwidth.

In other aspects of the wireless communication system 100, a UE 115 may include a synchronization channel frequency detecting component 340 (see e.g., FIG. 3) configured to detect a synchronization channel frequency as one of a plurality of possible synchronization channel frequencies where the synchronization channel frequency is an integer multiple of the synchronization channel raster. For example, synchronization channel frequency detecting component 340 can test multiple hypotheses of the synchronization channel frequencies until one or more synchronization signals are detected. As described above, the synchronization channel raster can be coarser than a channel raster used by the base station 105 and/or UE 115 where the channel raster is used to define the center carrier frequency of the system bandwidth.

In a specific example, wireless communication system 100 may have a UE-centric MAC layer. On the network side, the base stations 105 may broadcast a synchronization signal. The synchronization signal may be a unified synchronization signal that is supported by systems using a UE-centric MAC layer (e.g., UECM networks) as well as systems using a network-centric or non UE-centric MAC layer (e.g., nUECM networks). The UEs 115 may receive the synchronization signal by detecting the synchronization signal using multiple hypotheses for the synchronization channel frequency, as described above and further herein, acquire a timing of the network from the synchronization signal, and in response to acquiring the timing of the network, transmit a chirp signal that can indicate one or more signals requested from the base station 105 on-demand. The base station 105 can accordingly transmit the one or more signals over one or more channels to the UE 115 (e.g., master information block (MIB) and/or system information block (SIB) signals over a primary broadcast channel (PBCH), etc.).

Figure 2:
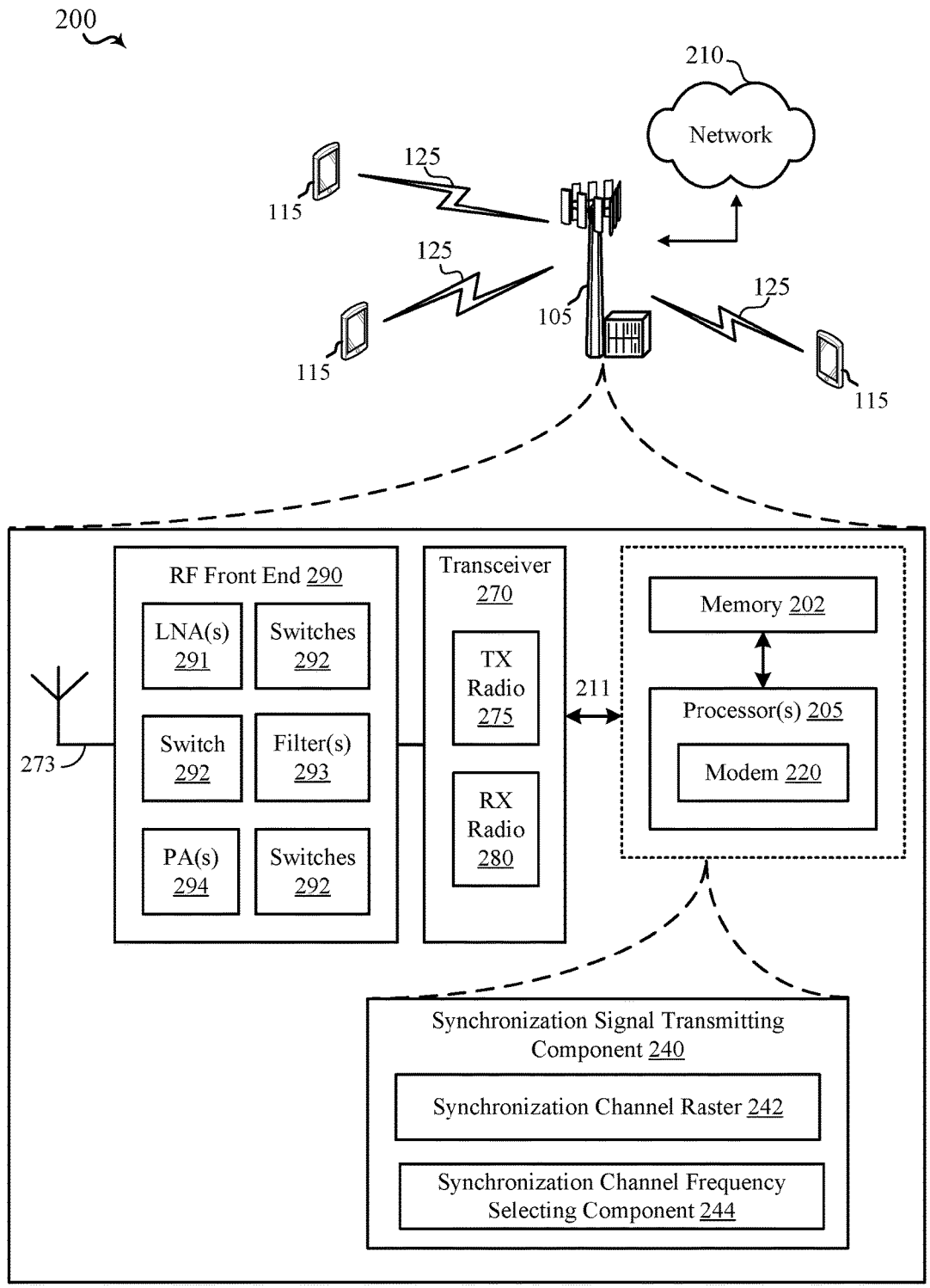
FIG. 2 is a block diagram illustrating an example of a base station, in accordance with various aspects of the present disclosure.
Figure 3:
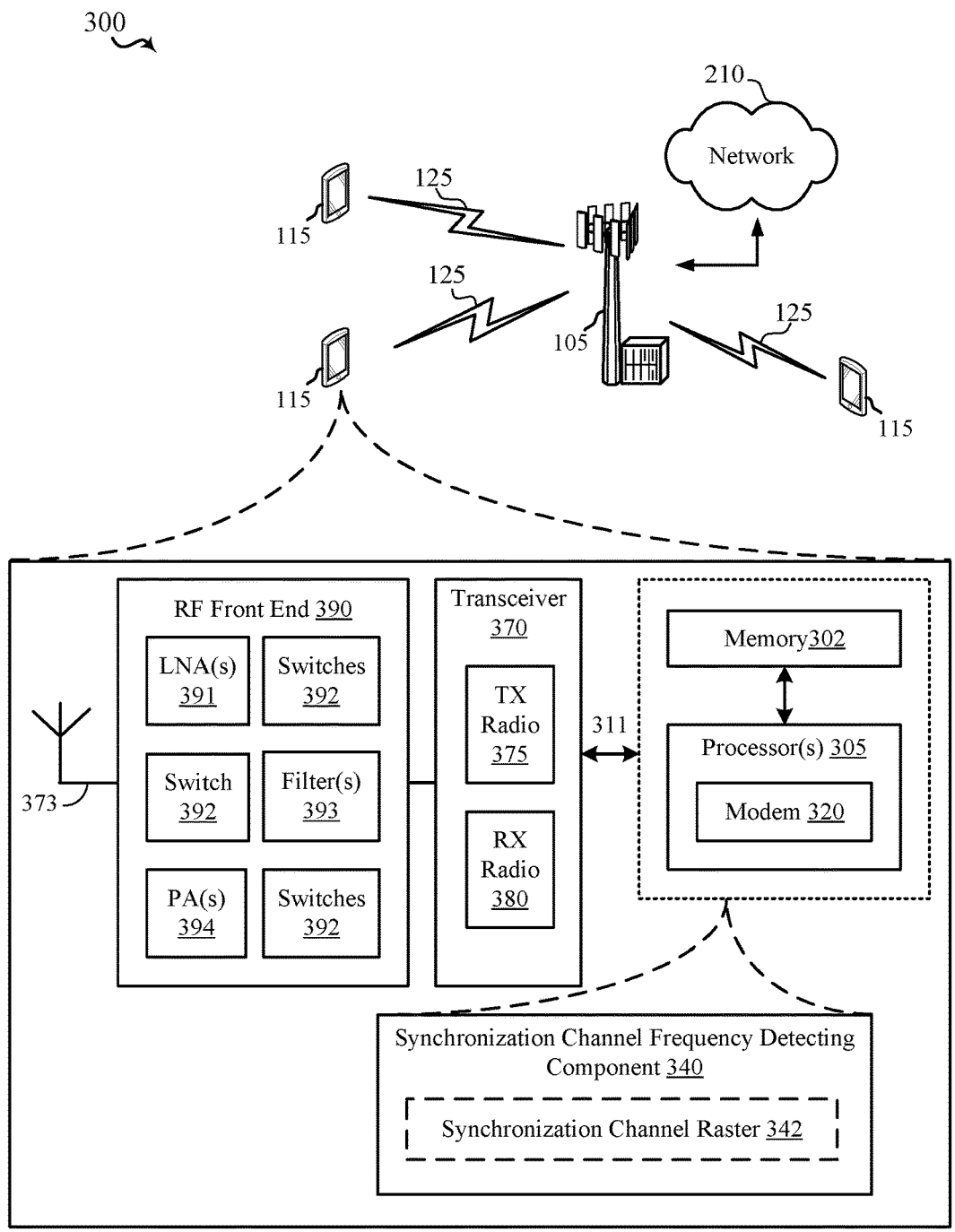
FIG. 3 is a block diagram illustrating an example of a UE, in accordance with various aspects of the present disclosure.
Figure 4:
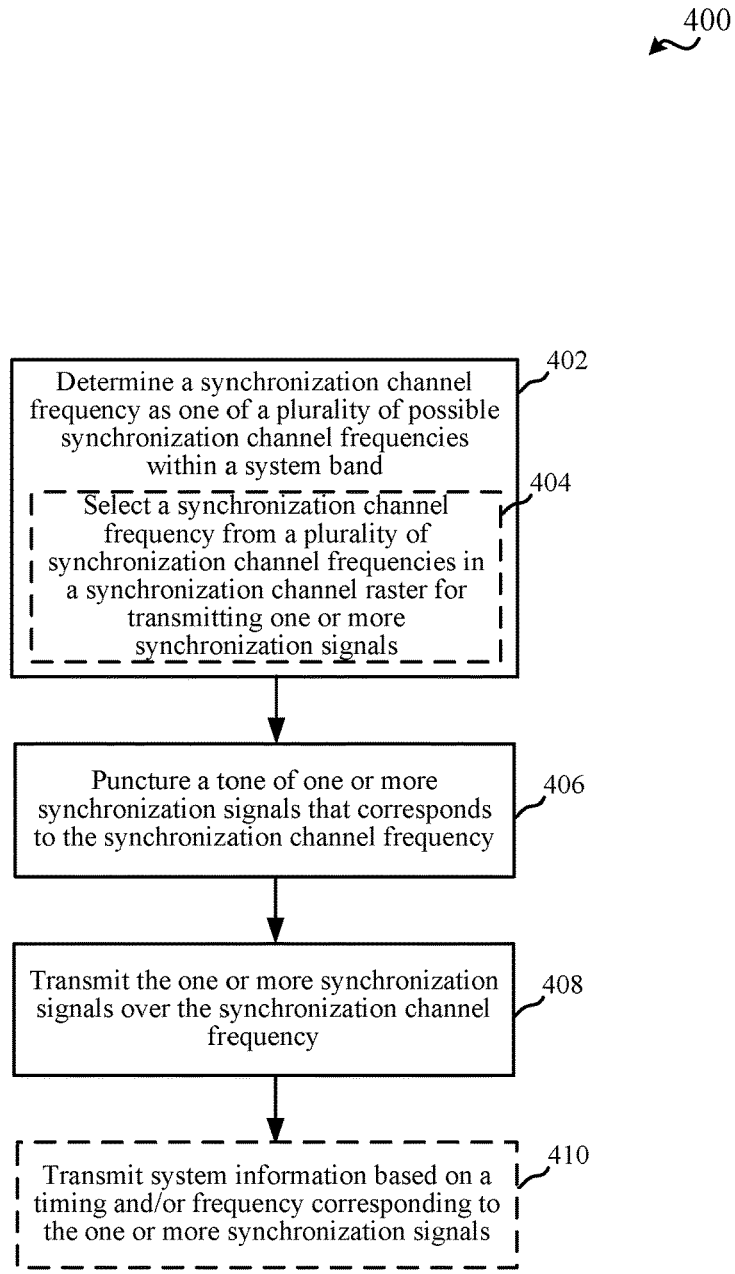
FIG. 4 is a flow chart illustrating an example method for transmitting synchronization signals, in accordance with various aspects of the present disclosure.
Figure 5:
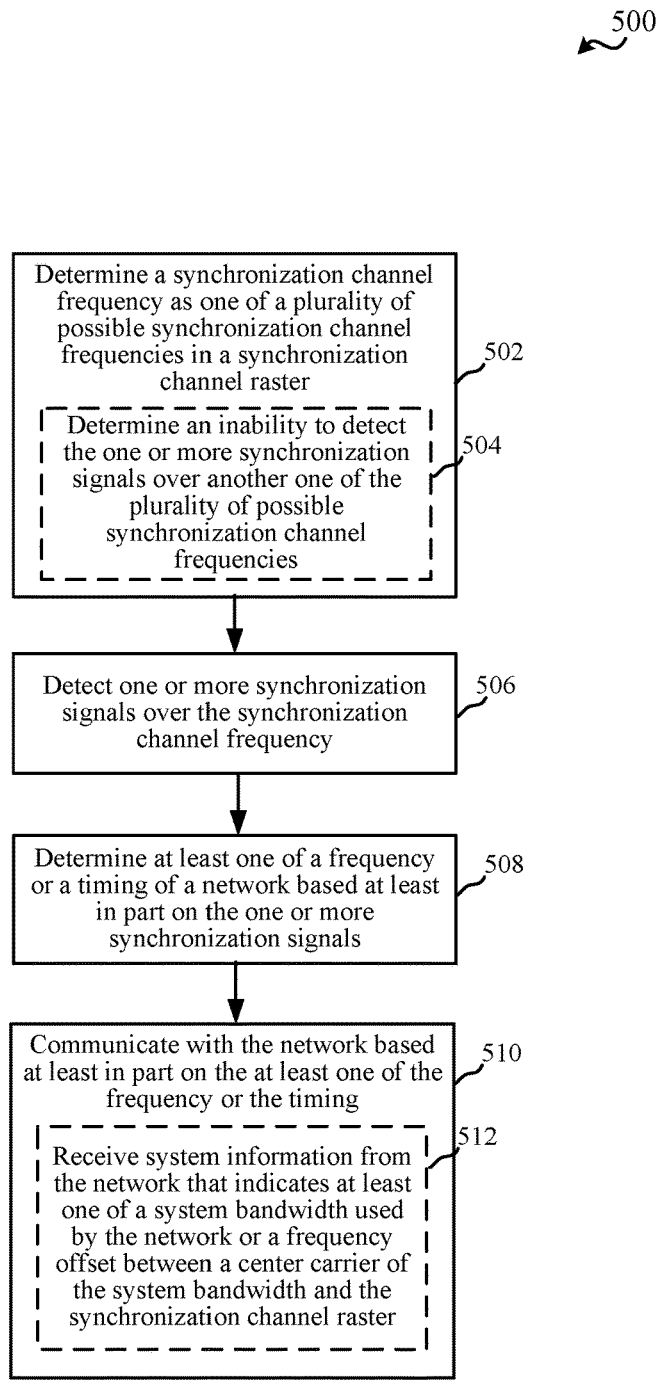
FIG. 5 is a flow chart illustrating an example method for receiving synchronization signals, in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, a block diagram 200 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to detect and process synchronization signals over one of a plurality of possible synchronization channel frequencies where synchronization channel is an integer multiple of the synchronization channel raster. Moreover the base station 105 may be an example of the base stations described in the present disclosure that are configured to transmit synchronization signals over one or more of a plurality of possible synchronization channel frequencies. In an example, the base station 105 in FIG. 2 may be part of a UECM network and may transmit a unified synchronization signal with other base stations.

In an aspect, the base station in FIG. 2 may include one or more processors 205 and/or memory 202 that may operate in combination with a synchronization signal transmitting component 240 to perform the functions, methodologies (e.g., method 400 of FIG. 4), or methods presented in the present disclosure. In accordance with the present disclosure, the synchronization signal transmitting component 240 may include a synchronization channel raster 242 for providing a plurality of possible frequencies where a center carrier frequency for transmitting a synchronization channel can be placed, and a synchronization channel frequency selecting component 244 configured for selecting a synchronization channel frequency from a plurality of synchronization channel frequencies in the synchronization channel raster 242 for transmitting one or more synchronization signals.

The one or more processors 205 may include a modem 220 that uses one or more modem processors. The various functions related to the synchronization signal transmitting component 240, and/or its sub-components, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the synchronization signal transmitting component 240.

In some examples, the synchronization signal transmitting component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to transmit signals generated by the synchronization signal transmitting component 240 to the UEs. RF front end 290 may be connected to one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels. In an aspect, the components of the RF front end 290 can connect with transceiver 270. The transceiver 270 may connect to one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or synchronization signal transmitting component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining synchronization signal transmitting component 240 and/or one or more of its sub-components. Additionally or alternatively, the base station 105 may include a bus 211 for coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 7. Similarly, the memory 202 may correspond to the memory described in connection with the base station in FIG. 7.

Referring to FIG. 3, a block diagram 300 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to detect and process synchronization signals over one of a plurality of possible synchronization channel frequencies where synchronization channel frequency is an integer multiple of the synchronization channel raster. Moreover the base station 105 may be an example of the base stations described in the present disclosure that are configured to transmit synchronization signals over one or more of a plurality of possible synchronization channel frequencies in a synchronization channel raster.

In an aspect, the UE 115 in FIG. 3 may include one or more processors 305 and/or memory 302 that may operate in combination with a synchronization channel frequency detecting component 340 to perform the functions, methodologies (e.g., method 500 of FIG. 5), or methods presented in the present disclosure. In accordance with the present disclosure, the synchronization channel frequency detecting component 340 may optionally include a synchronization channel raster 342 configured for determining a synchronization channel raster for attempting to detect the synchronization channel in one or more synchronization signals transmitted over one of a plurality of possible synchronization channel frequencies.

The one or more processors 305 may include a modem 320 that uses one or more modem processors. The various functions related to the synchronization channel frequency detecting component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the synchronization channel frequency detecting component 340.

In some examples, the synchronization channel frequency detecting component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to detect and/or receive synchronization signals to be processed by the synchronization channel frequency detecting component 340. RF front end 390 may be connected to one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can connect with transceiver 370. The transceiver 370 may connect to one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or synchronization channel frequency detecting component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining synchronization channel frequency detecting component 340 and/or one or more of its sub-components. Additionally or alternatively, the UE 115 may include a bus 311 for coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 7. Similarly, the memory 302 may correspond to the memory described in connection with the UE in FIG. 7.

FIG. 4 illustrates a flow chart of an example method 400 for transmitting (e.g., from a base station), one or more synchronization signals over one of a plurality of possible synchronization channel frequencies.

At Block 402, method 400 includes determining a synchronization channel frequency as one of a plurality of possible synchronization channel frequencies within a system band. In an aspect, synchronization channel frequency selecting component 244, e.g., in conjunction with processor(s) 205 and/or memory 202, can determine the synchronization channel frequency as one of the plurality of possible synchronization channel frequencies within the system band. For example, synchronization channel frequency selecting component 244 can determine the synchronization channel frequency as a frequency over which synchronization signals are transmitted within the system bandwidth.

In addition, for example, determining the synchronization channel frequency at Block 402 may optionally include, at Block 404, selecting a synchronization channel frequency from a plurality of synchronization channel frequencies in a synchronization channel raster for transmitting one or more synchronization signals. In an aspect, synchronization channel frequency selecting component 244, e.g., in conjunction with processor(s) 205 and/or memory 202, can select the synchronization channel frequency from the plurality of synchronization channel frequencies in the synchronization channel raster 242 for transmitting the one or more synchronization signals. As described, in an example, the synchronization channel frequency can be an integer multiple of the synchronization channel raster 242. For example, a minimum system bandwidth used by the base station 105 can include at least two synchronization channel frequencies over which synchronization signals can be fully transmitted (e.g., transmitted without leaking into a guard band and/or outside of the system bandwidth). This can allow the transceiver 270 to place a center carrier frequency on substantially any channel raster within the system bandwidth and can allow synchronization signal transmitting component 240 to transmit a full synchronization channel regardless of center carrier frequency selection, as described further below. In other words, in an example, the synchronization channel frequency may be different from the center carrier frequency of the system bandwidth.

Thus, allowing a plurality of possible synchronization channel frequencies in the synchronization channel raster 242 can provide flexibility to network operations (of base station 105) to select the center carrier frequency for wireless communications. In an example, synchronization channel frequency selecting component 244 can select the synchronization channel frequency based at least in part on at least one of a center carrier frequency of the system bandwidth, a size of the system bandwidth, a capability of transmitting the full synchronization signals around one or more synchronization channel frequencies, randomly selecting a synchronization channel frequency out of synchronization channel frequencies within the minimum system bandwidth that can transmit full synchronization signals, etc. In an example, synchronization channel frequency selecting component 244 may select a different synchronization channel frequency, synchronization channel bandwidth, and/or synchronization channel raster for a given system bandwidth.

In addition, for example, the synchronization channel raster 242 can be different from a channel raster used to define the center carrier frequency of the system bandwidth (also referred to herein as the "nominal channel raster"). For example, the synchronization channel raster 242 can be coarser than the nominal channel raster to allow a UE to detect the synchronization signal over one of the plurality of possible synchronization channel frequencies using less hypotheses than for carrier frequencies defined based on the nominal channel raster. For example, where the nominal channel raster is 100 kHz in LTE, the synchronization channel raster 242 may be a number of MHz, such as 1.4 MHz, 2.8 MHz, etc., as described below, meaning that synchronization channel frequencies may be spaced by the synchronization channel raster 242 over the LTE system bandwidth (e.g., every 1.4 MHz, 2.8 MHz, etc.). Moreover, for example, given a synchronization signal bandwidth across a system bandwidth, the synchronization channel raster may be different.

Additionally, for example, the synchronization channel raster 242 can be defined to comply with the nominal channel raster and a nominal subcarrier spacing defined for the wireless communication technology used by the base station 105. This subcarrier spacing (also referred to herein as the "nominal subcarrier spacing") may be used by the base station 105 in communicating with one or more UEs. For example, the synchronization channel raster 242 may be configured to be a least common multiple of nominal channel raster (e.g., spacing between center carrier frequencies) and the nominal subcarrier spacing. In this regard, synchronization signal transmitting component 240 may not need to indicate a frequency offset between the synchronization channel raster 242 (and may not need to indicate the nominal channel raster or nominal subcarrier spacing) to facilitate detection of a synchronization channel on the synchronization channel raster 242. In yet another example, synchronization channel raster 242 may be based on a bandwidth used for transmitting the synchronization signals as well.

Figure 6A:
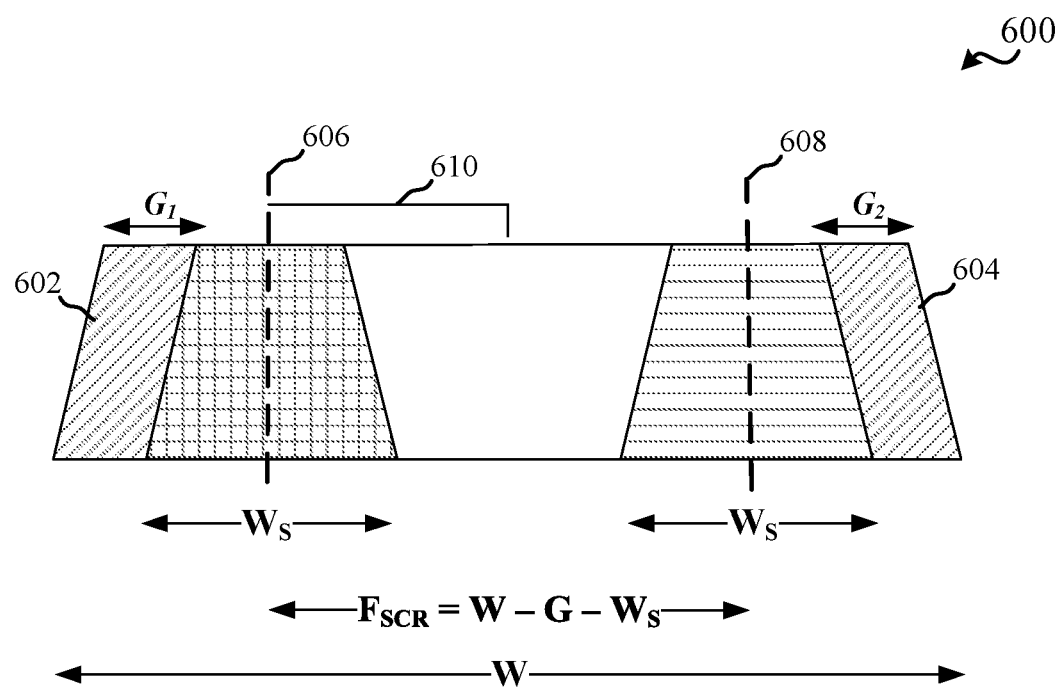
FIGS. 6A, 6B, and 6C are diagrams of example system bandwidth allocations in accordance with various aspects of the present disclosure.
Figure 6B:
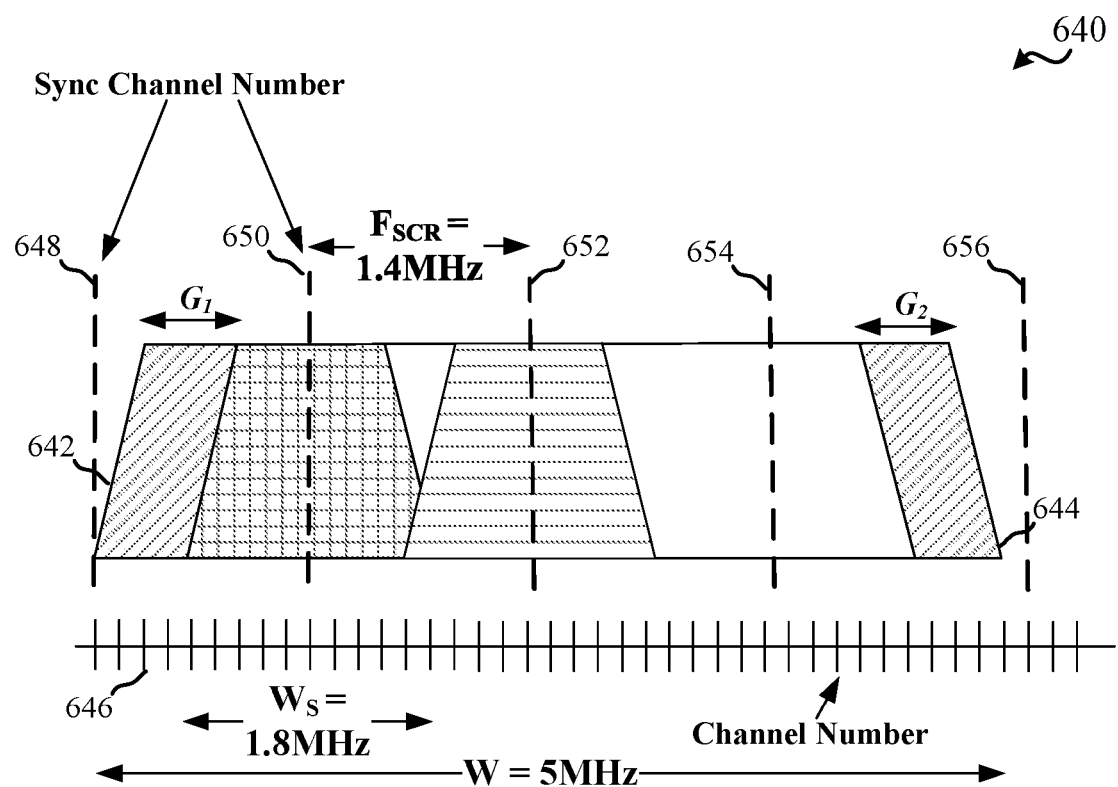
Figure 6C:
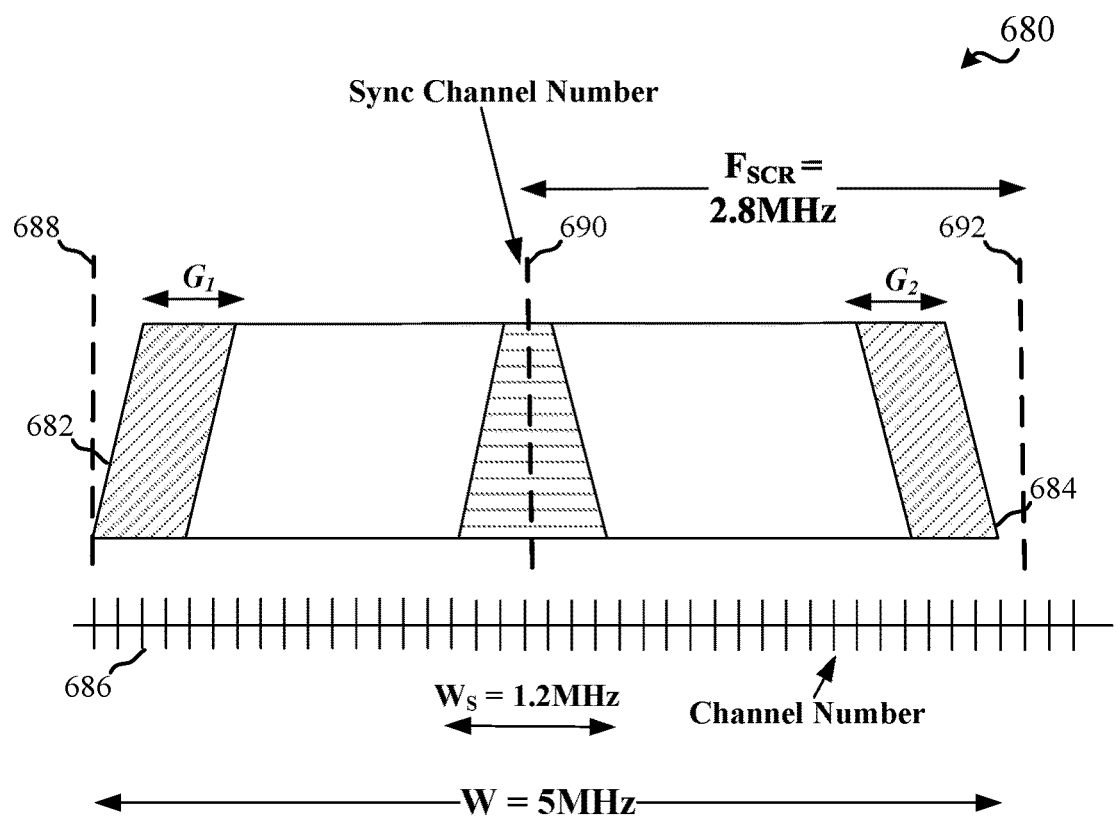

Specific examples of the synchronization channel raster 242 configuration are shown in FIGS. 6A, 6B, and 6C. FIG. 6A illustrates an example minimum system bandwidth (W) 600 over which one or more synchronization signals can be transmitted over a synchronization channel frequency (e.g., by a base station 105). Minimum system bandwidth W can include two guard band ($G_1$ and $G_2$) allocations 602 and 604 such that base station 105 attempts not to transmit beyond the guard band frequencies. For example, base station 105 can set one or more RF front end 290 components such to not transmit in or beyond the guard band allocations 602 and 604. In an example, where the minimum system bandwidth W is less than 5 megahertz (MHz), the guard band allocations 602 and/or 604 can be flex guard where the guard band frequencies may be used to transmit at least a portion of the signal in such a way that the transmitted signal in the guard band frequencies does not interfere with other signals in adjacent frequencies. Minimum system bandwidth W also includes two possible center carrier frequencies 606 and 608 for selecting for transmitting one or more synchronization signals. The synchronization channels can have a bandwidth $W_S$ (also referred to herein as the "synchronization channel bandwidth") around the center carrier frequency, such that the synchronization channel raster ($F_{SCR}$) 242 can correspond to (e.g., can be less than or equal to) $W-G-W_S$, where $G=G_1+G_2$. In other words, synchronization channel raster ($F_{SCR}$) 242 can be described based on:

$$F_{SCR} \leq W-G-W_S \qquad (1)$$

In another aspect, as described in an example above, synchronization channel raster ($F_{SCR}$) 242 can be configured as a function of the nominal channel raster ($F_{CR}$) and a subcarrier spacing used by the base station 105 in communicating with one or more UEs (the nominal subcarrier spacing, $\Delta f$). For example, synchronization channel raster ($F_{SCR}$) 242 can be a multiple (or multiples) of a least common multiple (LCM) of the nominal channel raster, $F_{CR}$, and the nominal subcarrier spacing, $\Delta f$. In one example, $F_{SCR}$ 242 can be calculated based on:

$$F_{SCR}=K*LCM(F_{CR},\Delta f) \qquad (2)$$

where K is a positive integer. Additionally, synchronization channel bandwidth $W_S$ can be selected such that any channel number may be used. In an example, $W_S \leq W-F_{SCR}-G$. In one specific example, the following parameter values can be used in the example shown in FIG. 6A.

| Parameter | Value |
|---|---|
| W | 5 MHz |
| G | 1.0 MHz |
| $F_{CR}$ | 100 kHz |
| $\Delta f$ | 35 kHz |
| K | 2 |
| $F_{SCR}$ | 1.4 MHz |
| $W_S$ | ≤2.6 MHz (e.g., 4 resource blocks (RB) = 2.24 MHz in LTE) |

Additionally, in an example, the center carrier frequency 606 (or 608) of the selected synchronization channel can be at a frequency offset 610 from the center carrier frequency of the system bandwidth. In one example, a base station 105 can indicate this frequency offset 610 value to a UE 115 (e.g., in system information broadcast signaling, RRC signaling, etc.) such that the UE 115 may determine the synchronization channel based on the frequency offset 610 and a detected center carrier frequency of the system bandwidth.

FIG. 6B illustrates an additional example minimum system bandwidth (W) 640 having guard band allocations 642 and 644. Additionally, the nominal channel raster, $F_{CR}$, 646 is depicted. In this example, the following parameter values can be used, where $N_S$ is the number of frequency tones corresponding to the synchronization channel bandwidth.

| Parameter | Value |
|---|---|
| W | 5 MHz |
| G | 1.0 MHz |
| $F_{CR}$ | 100 kHz |
| $\Delta f$ | 35 kHz |
| K | 2 |
| $F_{SCR}$ | 1.4 MHz |
| $W_S$ | 1.8 MHz |
| $N_S$ | Up to 51 tones usable for the synchronization channel. 3 RBs if using RB timeline |

In this example, synchronization channel raster ($F_{SCR}$) 242 can be selected to be 1.4 MHz (e.g., based on the formulas above), and (e.g., starting with the first frequency in the system bandwidth) can correlate to possible synchronization channel frequencies 648, 650, 652, 654, and 656, though synchronization channel frequencies 648, 654, and 656 may not be usable, as transmitting a synchronization signal centered at these frequencies may result in utilization of guard band allocations 642 and/or 644 (and/or beyond the minimum system bandwidth W 640). Thus, for example, synchronization channel frequency selecting component 244 can select one of the possible synchronization channel frequencies 650 or 652 as a center carrier frequency for a synchronization channel for transmitting one or more synchronization signals according to the synchronization channel bandwidth. In an example, the synchronization channel frequencies 648, 650, 652, 654, 656 (and/or the useable synchronization channel frequencies 605, 652) maybe indexed as a sequential number for identifying the synchronization channel frequencies within the synchronization channel raster 242 (e.g., as synchronization channel frequencies 1, 2, . . . , etc.), a number corresponding to the actual carrier frequency, an index of a corresponding channel frequencies on the nominal channel raster, or using substantially any identifier.

FIG. 6C illustrates an additional example minimum system bandwidth (W) 680 having guard band allocations 682 and 684. Additionally, the nominal channel raster, $F_{CR}$, 686 is depicted. In this example, the following parameter values can be used.

| Parameter | Value |
| --- | --- |
| W | 5 MHz |
| G | 1.0 MHz |
| $F_{CR}$ | 100 kHz |
| Δf | 35 kHz |
| K | 2 |
| $F_{SCR}$ | 2.8 MHz |
| $W_S$ | 1.2 MHz |
| $N_S$ | Up to 34 tones usable for the synchronization channel. 2 RBs if using RB timeline |

In this example, synchronization channel raster ($F_{SCR}$) 242 can be selected to be 2.8 MHz (e.g., based on the formulas above), and (e.g., starting with the first frequency in the system bandwidth) can correlate to possible synchronization channel frequencies 688, 690, 692, though synchronization channel frequencies 688 and 692 may not be usable, as transmitting a synchronization signal centered at these frequencies may result in utilization of guard band allocations 682 and/or 684 (and/or beyond the minimum system bandwidth W 680). Thus, for example, synchronization channel frequency selecting component 244 can select the possible synchronization channel frequency 690 as a center carrier frequency for a synchronization channel for transmitting one or more synchronization signals according to the synchronization channel bandwidth.

In yet another specific example, the synchronization channel raster 242 may be dependent on a band utilized by the base station 105 for communicating in the wireless network. For example, different bands may have different associated minimum system bandwidths, and the synchronization channel raster 242 and/or synchronization channel bandwidth may be accordingly adjusted. One example can be the following:

| Option | Band | Minimum System Bandwidth | Sync Channel Raster 242 | Sync bandwidth | # Sync Tones |
| --- | --- | --- | --- | --- | --- |
| 1 | ≤3.5 GHz | 5 MHz | 1.4 MHz | 1.68 MHz | 48 |
| 2 | ≤3.5 GHz | 5 MHz | 2.8 MHz | 1.12 MHz | 32 |
| 3 | >3.5 GHz | 10 MHz | 4.9 MHz | 1.68 MHz | 48 |
| 4 | >3.5 GHz | 10 MHz | 6.3 MHz | 1.12 MHz | 32 |
| 5 | >3.5 GHz | 20 MHz | 13.3 MHz | 1.68 MHz | 48 |
| 6 | >3.5 GHz | 20 MHz | 14.7 MHz | 1.12 MHz | 32 |

Referring back to FIG. 4, at Block 406, after determining a synchronization channel frequency as one of a plurality of possible synchronization channel frequencies within a system, method 400 includes puncturing a tone of one or more synchronization signals that corresponds to the synchronization channel frequency. In an aspect, synchronization signal transmitting component 240, e.g., in conjunction with processor(s) 205, memory 202, and/or transceiver 270, can puncture the tone of one or more synchronization signals that corresponds to the synchronization channel frequency. For example, synchronization signal transmitting component 240 can puncture the DC tone of the one or more synchronization signals. As used herein, "puncturing" can refer to transmitting zero power (or refraining from transmitting) over a given frequency tone. This can facilitate detecting the synchronization signal by one or more UEs. Moreover, in an example, puncturing the tone at Block 406 may occur as part of transmitting the signals at Block 408, as described below. Because the synchronization channel frequency can be over substantially any frequency in the system bandwidth, the punctured DC tone of the one or more synchronization signals can differ from the DC tone of the system bandwidth.

Concurrently with or subsequent to puncturing a tone of one or more synchronization signals that correspond to the synchronization channel frequency, at Block 408, method 400 includes transmitting one or more synchronization signals over the synchronization channel frequency. In an aspect, synchronization signal transmitting component 240, e.g., in conjunction with processor(s) 205, memory 202, and/or transceiver 270, can transmit the one or more synchronization signals over the synchronization channel frequency (e.g., where the synchronization channel frequency may be an integer multiple of the synchronization channel raster 242, as selected by synchronization channel frequency selecting component 244). As described, synchronization signal transmitting component 240 can transmit the one or more synchronization signals by using a center carrier frequency corresponding to one or more synchronization channel frequencies. In this example, synchronization signal transmitting component 240 may adjust one or more RF front end 290 components to center on the center carrier frequency and to facilitate transmitting of the one or more synchronization signals around the synchronization channel frequency and according to the synchronization channel bandwidth. In an example, synchronization signal transmitting component 240 may transmit the one or more synchronization signals over one or more of the possible synchronization channel frequencies in one or more periods of time (e.g., based on a periodic interval, on-demand, etc.). Moreover, in some examples, the selected synchronization channel frequency, and/or the synchronization signals/channel as transmitted over the synchronization channel frequency, may overlap tones assigned for data channel communications, and thus synchronization signal transmitting component 240 may puncture one or more tones (e.g., DC tones) in transmitting the one or more synchronization signals over the synchronization channel frequency (as described in Block 406 of FIG. 4).

At Block 410, method 400 optionally includes transmitting system information based on a timing and/or frequency corresponding to the one or more synchronization signals. In an aspect, transceiver 270, e.g., in conjunction with processor(s) 205 and/or memory 202, can transmit the system information based on the timing and/or frequency corresponding to the one or more synchronization signals. For example, transceiver 270 can transmit the system information in one or more MIBs, SIBs, etc. over a PBCH or other broadcast channel. Transceiver 370 may transmit the system information based on a timing used in transmitting the synchronization signal(s) over the synchronization channel frequency. In one example, the system information may include the frequency offset between the center carrier frequency of the system bandwidth and the synchronization channel frequency (e.g., offset 610 described above in FIG. 6A). Thus, for example, a UE receiving the synchronization signal(s) can determine the center carrier frequency of the system bandwidth for communicating with the base station 105 based on the synchronization channel raster 242 and the frequency offset signaled in the system information.

FIG. 5 illustrates a flow chart of an example method 500 for detecting (e.g., by a UE) one or more synchronization signals received over one of a plurality of possible synchronization channel frequencies.

At Block 502, method 500 includes determining a synchronization channel frequency as one of a plurality of possible synchronization channel frequencies in a synchronization channel raster. In an aspect, synchronization channel frequency detecting component 340, e.g., in conjunction with processor(s) 305, memory 302, and/or transceiver 370, can determine the synchronization channel frequency as the one of the plurality of possible synchronization channel frequencies in the synchronization channel raster 342. In an example, as described, the synchronization channel frequency can be an integer multiple of the synchronization channel raster 342. For example, synchronization channel raster 342 can be configured similarly as synchronization channel raster 242 of a base station 105, as described above, to be coarser than a channel raster used for other communications. Similarly, for example, synchronization channel raster 342 can be configured as a function of the channel raster used for other communications and a subcarrier spacing defined for the wireless communication system utilized by the base station 105 and UE 115 to facilitate wireless communications. As described above, the base station 105 can select one of a plurality of possible synchronization channel frequencies on synchronization channel raster 242 for transmitting synchronization signals. Synchronization channel frequency detecting component 340 can detect which of the plurality of possible synchronization channel frequencies the base station 105 utilizes to transmit the synchronization signals based at least in part on testing multiple hypotheses of the plurality of synchronization channel frequencies in the synchronization channel raster 342 (e.g., until one or more synchronization signals are detected).

Thus, for example, determining the synchronization channel at Block 502 may optionally include, at Block 504, determining an inability to detect the one or more synchronization signals over another one of the plurality of possible synchronization channel frequencies. In an aspect, synchronization channel frequency detecting component 340, e.g., in conjunction with processor(s) 305, memory 302, and/or transceiver 370, can determine the inability to detect the one or more synchronization signals over another one of the plurality of possible synchronization channel frequencies. For example, synchronization channel frequency detecting component 340 may detect zero energy and/or energy below a threshold over the synchronization channel frequency(s), and may accordingly move to another (e.g., the next) synchronization channel frequency depending on the synchronization channel raster 342. In example, synchronization channel frequency detecting component 340 may attempt to detect the synchronization channel starting with a first synchronization channel frequency (e.g., at a starting frequency of the system bandwidth such as for example, possible synchronization channel frequencies 648 and 688 of FIGS. 6B and 6C, respectively).

Method 500 may also include, at Block 506, detecting one or more synchronization signals over the synchronization channel frequency. In an aspect, synchronization channel frequency detecting component 340, e.g., in conjunction with processor(s) 305, memory 302, and/or transceiver 370, can detect the one or more synchronization signals over the synchronization channel frequency. For example, synchronization channel frequency detecting component 340 can detect the one or more synchronization signals based on detecting signals received at a threshold level over the frequency resources corresponding to the determined synchronization channel frequency, detecting signals that use a particular sequence over the frequency resources corresponding to the determined synchronization channel frequency, and/or the like.

Method 500 may also include, at Block 508, determining at least one of a frequency or a timing of the network based at least in part on the one or more synchronization signals. In an aspect, transceiver 370, e.g., in conjunction with processor(s) 305 and/or memory 302, can determine at least one of the frequency or the timing of the network based at least in part on the one or more synchronization signals. In an example, the synchronization signal(s) may be transmitted according to a timing, and the timing can be observed from the synchronization signal(s). In any case, for example, transceiver 370 may tune or adjust one or more RF front end 390 components based on the determined timing and/or frequency utilized by base station 105 to communicate therewith.

Accordingly, method 500 may also include, at Block 510, communicating with the network based at least in part on the at least one of the frequency or the timing. In an aspect, transceiver 370, e.g., in conjunction with processor(s) 305 and/or memory 302, can communicate with the network based at least in part on the at least one of the frequency or the timing. In an example, transceiver 370 can receive and/or transmit communications from/to base station 105 based on the timing and/or frequency determined from the synchronization signal(s) received over the one of the plurality of possible synchronization channel frequencies, where the synchronization channel frequency can be an integer multiple of the synchronization channel raster 342. For example, transceiver 370 can receive and/or transmit one or more other control data signals, user plane data signals, etc. based on the determined timing and/or frequency.

In an example, communicating with the network at Block 510 may optionally include, at Block 512, receiving system information from the network that indicates at least one of a system bandwidth used by the network or a frequency offset between the center carrier frequency of the system bandwidth and the synchronization channel frequency selected to transmit the synchronization signals. In an aspect, transceiver 370, e.g., in conjunction with processor(s) 305 and/or memory 302, can receive the system information from the network that indicates at least one of the system bandwidth used by the network or the frequency offset between the center carrier frequency of the system bandwidth and the synchronization channel frequency selected to transmit the synchronization signals. For example, transceiver 370 may receive the system information in one or more MIBs, SIBs, etc. transmitted by the base station 105 in a PBCH or other broadcast channel. For example, transceiver 370 may receive the system information based on a timing and/or frequency determined from the synchronization signal(s), as described. Moreover, in an example, transceiver 370 can determine the center carrier of the system bandwidth based on the received frequency offset (e.g., and the synchronization channel raster 242) and/or may determine the received system bandwidth, and may accordingly communicate with the base station based at least in part on the center frequency of the system bandwidth and the system bandwidth.

Figure 7:
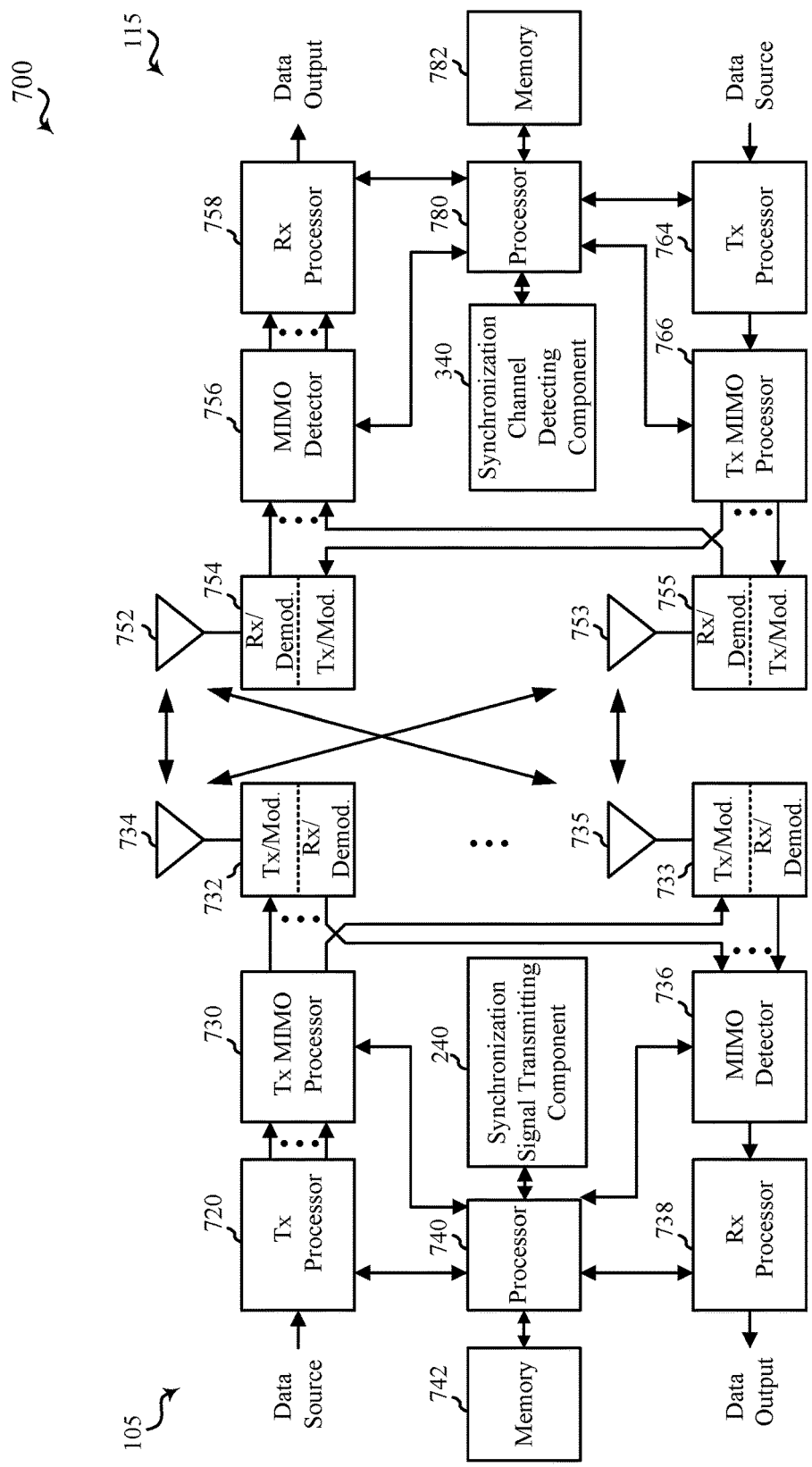
FIG. 7 is a block diagram illustrating an example of a MIMO communication system including a base station and a UE, in accordance with various aspects of the present disclosure.

FIG. 7 is a block diagram of a MIMO communication system 700 including a base station 105 and a UE 115. The MIMO communication system 700 may illustrate aspects of the wireless communication system 100 described with reference to FIG. 1. The base station 105 may be an example of aspects of the base station 105 described with reference to FIGS. 1, 2, and 3. The base station 105 may be equipped with antennas 734 and 735, and the UE 115 may be equipped with antennas 752 and 753. In the MIMO communication system 700, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 115 may be an example of aspects of the UEs 115 described with reference to FIGS. 1, 2, and 3. At the UE 115, the UE antennas 752 and 753 may receive the DL signals from the base station 105 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 115 to a data output, and provide decoded control information to a processor 780, or memory 782.

The processor 780 may in some cases execute stored instructions to instantiate a synchronization channel frequency detecting component 340 (see e.g., FIGS. 1 and 3).

On the uplink (UL), at the UE 115, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 105 in accordance with the communication parameters received from the base station 105. At the base station 105, the UL signals from the UE 115 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a synchronization signal transmitting component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for synchronizing frequency and/or timing in a wireless communication system, comprising:
   determining, based at least in part on a carrier frequency band of a system bandwidth, a synchronization channel raster that is larger than a channel raster used to define a center carrier frequency of the system bandwidth;
   determining a plurality of possible synchronization channel frequencies as part of the synchronization channel raster;
   determining a synchronization channel frequency as one of the plurality of possible synchronization channel frequencies within the carrier frequency band;
   puncturing a tone of one or more synchronization signals that corresponds to the synchronization channel frequency;
   transmitting, via a transceiver, the one or more synchronization signals centered around the synchronization channel frequency; and
   communicating via the transceiver, based on the one or more synchronization signals, and using a system bandwidth based on the center carrier frequency of the system bandwidth, with one or more user equipment (UEs), wherein the center carrier frequency is at an offset from the synchronization channel frequency.

2. The method of claim 1, wherein the tone is at a direct current (DC) tone of the one or more synchronization signals.

3. The method of claim 1, further comprising determining the synchronization channel raster as at least a common multiple of a channel raster for the system bandwidth and a subcarrier spacing.

4. The method of claim 1, further comprising determining a synchronization channel bandwidth for transmitting the one or more synchronization signals based at least in part on the system bandwidth.

5. The method of claim 1, further comprising transmitting one or more system information signals indicating at least one of the system bandwidth or the offset.

6. An apparatus for synchronizing frequency and/or timing in a wireless communication system, comprising:
   a transceiver;
   a memory configured to store instructions; and
   at least one processor coupled to the transceiver and the memory, the at least one processor being configured to execute the instructions to:
   determine, based at least in part on a carrier frequency band of a system bandwidth, a synchronization channel raster that is larger than a channel raster used to define a center carrier frequency of the system bandwidth;
   determine a plurality of possible synchronization channel frequencies as part of the synchronization channel raster;
   determine a synchronization channel frequency as one of the plurality of possible synchronization channel frequencies within the carrier frequency band;
   puncture a tone of one or more synchronization signals that corresponds to the synchronization channel frequency;
   transmit, via the transceiver, the one or more synchronization signals centered around the synchronization channel frequency; and
   communicate, via the transceiver, based on the one or more synchronization signals, and using a system bandwidth based on the center carrier frequency of the system bandwidth, with one or more user equipment (UEs), wherein the center carrier frequency is at an offset from the synchronization channel frequency.

7. The apparatus of claim 6, wherein the tone is at a direct current (DC) tone of the one or more synchronization signals.

8. The apparatus of claim 6, wherein the at least one processor is further configured to determine the synchronization channel raster as a least common multiple of a channel raster for the system bandwidth and a subcarrier spacing.

9. The apparatus of claim 6, wherein the at least one processor is further configured to determine a synchronization channel bandwidth for transmitting the one or more synchronization signals based at least in part on the system bandwidth.

10. The apparatus of claim 6, wherein the at least one processor is further configured to transmit one or more system information signals indicating at least one of the system bandwidth or the offset.

11. An apparatus for synchronizing frequency and/or timing in a wireless communication system, comprising:
  means for determining, based at least in part on a carrier frequency band of a system bandwidth, a synchronization channel raster that is larger than a channel raster used to define a center carrier frequency of the system bandwidth;
  means for determining a plurality of possible synchronization channel frequencies as part of the synchronization channel raster;
  means for determining a synchronization channel frequency as one of the plurality of possible synchronization channel frequencies within the carrier frequency band;
  means for puncturing a tone of one or more synchronization signals that corresponds to the synchronization channel frequency;
  means for transmitting, via a transceiver, the one or more synchronization signals centered around the synchronization channel frequency; and
  means for communicating, via the transceiver, based on the one or more synchronization signals, and using a system bandwidth based on the center carrier frequency of the system bandwidth, with one or more user equipment (UEs), wherein the center carrier frequency is at an offset from the synchronization channel frequency.

12. The apparatus of claim 11, wherein the tone is at a direct current (DC) tone of the one or more synchronization signals.

13. The apparatus of claim 11, further comprising means for determining the synchronization channel raster as a least common multiple of a channel raster for the system bandwidth and a subcarrier spacing.

14. The apparatus of claim 11, further comprising means for determining a synchronization channel bandwidth for transmitting the one or more synchronization signals based at least in part on the system bandwidth.

15. A non-transitory computer-readable medium storing code executable by a processor for synchronizing frequency and/or timing in a wireless communication system, comprising:
  code for determining, based at least in part on a carrier frequency band of a system bandwidth, a synchronization channel raster that is larger than a channel raster used to define a center carrier frequency of the system bandwidth;
  code for determining a plurality of possible synchronization channel frequencies as part of the synchronization channel raster;
  code for determining a synchronization channel frequency as one of the plurality of possible synchronization channel frequencies within the carrier frequency band;
  code for puncturing a tone of one or more synchronization signals that corresponds to the synchronization channel frequency;
  code for transmitting, via a transceiver, the one or more synchronization signals centered around the synchronization channel frequency; and
  code for communicating, via the transceiver, based on the one or more synchronization signals, and using a system bandwidth based on the center carrier frequency of the system bandwidth, with one or more user equipment (UEs), wherein the center carrier frequency is at an offset from the synchronization channel frequency.

16. The non-transitory computer-readable medium of claim 15, wherein the tone is at a direct current (DC) tone of the one or more synchronization signals.

17. The non-transitory computer-readable medium of claim 15, further comprising code for determining the synchronization channel raster as a least common multiple of a channel raster for the system bandwidth and a subcarrier spacing.

18. The non-transitory computer-readable medium of claim 15, further comprising code for determining a synchronization channel bandwidth for transmitting the one or more synchronization signals based at least in part on the system bandwidth.

* * * * *